United States Patent [19]

Imura et al.

[11] Patent Number: 5,556,931
[45] Date of Patent: Sep. 17, 1996

[54] POLYMERIZABLE COMPOSITION AND ORGANIC GLASS

[75] Inventors: Satoshi Imura; Hironobu Nagoh, both of Tsukuba; Kazuhiko Kuramoto, Tokuyama, all of Japan

[73] Assignee: Tokuyama Corporation, Yamaguchi-ken, Japan

[21] Appl. No.: 499,070

[22] Filed: Jul. 6, 1995

[30] Foreign Application Priority Data

Jul. 8, 1994 [JP] Japan ................................. 6-157007

[51] Int. Cl.$^6$ ........................ C08F 220/20; C08F 220/10
[52] U.S. Cl. ................................ 526/323.1; 526/328.5
[58] Field of Search ........................ 526/323.1, 328.5

[56] References Cited

FOREIGN PATENT DOCUMENTS 4-202308  7/1992  Japan .
4-202309  7/1992  Japan .

*Primary Examiner*—Joseph L. Schofer
*Assistant Examiner*—Wu C. Cheng
*Attorney, Agent, or Firm*—Birch, Stewart, Kolasch & Birch, LLP

[57] ABSTRACT

A polymerizable composition comprising at least two di(meth)acrylate compounds of the specific general formula (I), e.g., dimethacrylate compounds of polyethylene glycol adduct of 2,2-bis(4-hydroxyphenyl)propane, wherein the content of di(meth)acrylate compound of the general formula (I) in which m+n is 2 to 3 is 30 to 80 mol % and the content of di(meth)acrylate compound of the general formula (I) in which m+n is 6 to 12 is 20 to 50 mol %, and organic glass formed of a polymer from the polymerizable composition, the polymerizable composition being suitable as a transparent resin, particularly as a raw material for an ophthalmic lens which is free of optical strain, has sufficient hardness and is excellent in impact resistance and light resistance.

12 Claims, No Drawings

POLYMERIZABLE COMPOSITION AND ORGANIC GLASS

FIELD OF THE INVENTION

The present invention relates to a transparent resin advantageous for organic glass, particularly to a polymerizable composition suitable as a raw material for ophthalmic lenses. More specifically, it relates to a polymerizable composition suitable for producing ophthalmic lenses which are free of optical strain, sufficiently hard and excellent in impact strength and light resistance.

PRIOR ART OF THE INVENTION

Studies have been variously made for developing organic glass that can replace inorganic glass, while developed organic glass is defective in many ways and no organic glass having satisfactory properties has been obtained. For example, a polymer produced from a monomer containing methyl methacrylate or diethylene glycol bis(arylcarbonate) as a main component is used as an optical material or a lens. However, this polymer has a low refractive index, as low as about 1.50.

On the other hand, polycarbonate-based glass and polysulfone-based organic glass have been proposed. These glass materials have a high refractive index of about 1.60, while they have problems in a low light transmittance, deficient optical uniformity and coloring.

Various organic glass materials have been proposed which are formed of crosslinked polymers improved in the above properties. Above all, a crosslinked polymer obtained by polymerizing a di(meth)acrylate compound having a bisphenol structure, as a monomer, is useful, and a polymerizable composition containing this monomer has been proposed. For example, JP-A-4-202308 and JP-A-4-202309 disclose a polymerizable composition for an ophthalmic lens, which contains, as main monomer components, a di(meth)acrylate compound of the following formula (A) and a polybutylene glycol di(meth)acrylate compound.

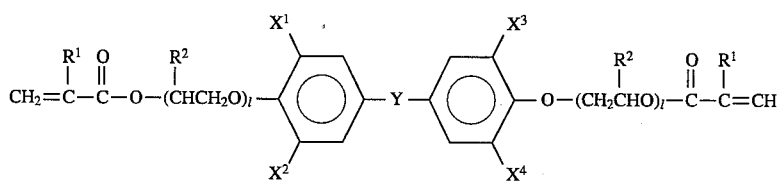
(A)

wherein each of $R^1$ and $R^2$ is hydrogen or methyl, each of $X^1$, $X^2$, $X^3$ and $X^4$ is hydrogen, chlorine, bromine, methyl or phenyl, Y is

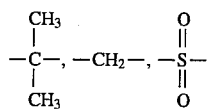

or -S-, and l is an integer of 0 to 5.

In the di(meth)acrylate compound of the formula (A), the group Y bonding two phenyl rings is selected from

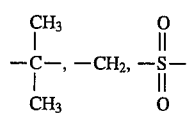

and -S-.

Further, l showing the number of ethylene glycol units is an integer of 0 to 5.

The above publications specifically describe compounds as the di(meth)acrylate compound of the formula (A), and that these di(meth)acrylate compounds may be used alone or in combination. However, the above publications describe or suggest nothing concerning a specific example of the combination of at least two di(meth)acrylate compounds and the function and effect of the combination.

A polymer obtained from a di(meth)acrylate compound of the formula (A) in which Y is $-CH_2$

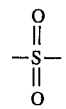

or -S- is insufficient in light resistance and impact resistance. Further, a polymer obtained from a di(meth)acrylate compound of the formula (A) in which Y

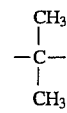

is has defects in that it is insufficient in impact resistance when the total of two l's is 2 or 3, and that it is poor in hardness when the total of two l's is as large as about 10.

SUMMARY OF THE INVENTION

It is a first object of the present invention to provide a polymer having a refractive index sufficient for use as an organic lens and further having light resistance, impact resistance and hardness sufficient for use as an organic lens.

It is a second object of the present invention to provide a polymer for an organic lens of which the optical strain and coloring are decreased.

It is a third object of the present invention to provide a polymerizable composition which gives the above organic lens.

It is further another object of the present invention to provide an organic lens, particularly an ophthalmic lens, having the above-described properties.

According to the present invention, the above objects and advantages of the present invention are achieved by a polymerizable composition comprising (1) 100 parts by weight of a di(meth)acrylate compound (Component I) of the general formula (I),

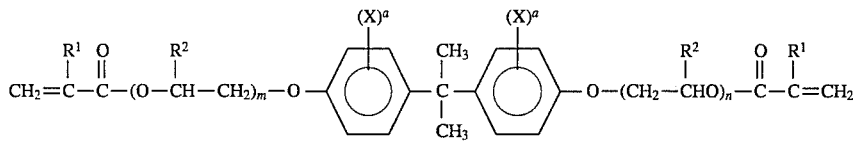

$$\text{(I)}$$

wherein each of $R^1$ and $R^2$ is independently hydrogen or methyl, each of m and n is independently an integer of 1 to 15, X is a halogen excluding fluorine, and a is an integer of 0 to 4, provided that, when the amount of Component I is 100 mol %, Component I contains 30 to 80 mol % of a di(meth)acrylate compound of the general formula (I) in which m + n is 2 to 3 and 20 to 50 mol % of a di(meth)acrylate compound of the general formula (I) in which m + n is 6 to 12, and (2) 0 to 25 parts by weight of at least one monomer (Component II) of the general formula (II),

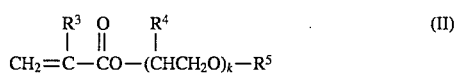

$$\text{(II)}$$

wherein each of $R^3$ and $R^4$ is independently hydrogen or methyl, $R^5$ is hydrogen, an alkyl group having 1 to 6 carbon atoms, an aralkyl group having 7 to 12 carbon atoms, an aryl group having 6 to 15 carbon atoms, a cycloalkyl group having 3 to 10 carbon atoms, a glycidyl group, a cyano group, an acryl group or a methacryl group, and k is an integer of 0 to 10.

That is, according to the present invention, the above objects and advantages of the present invention are achieved by a polymerizable composition containing, as a main monomer, a di(meth)acrylate compound of the above general formula (I) which is a combination of at least two compounds included in the compound of the general formula (I), in the above-specified amount ratio. Specifically, a polymer excellent in the above-described properties can be obtained when the di(meth)acrylate compound of the general formula (I) is a combination of a monomer in which the recurring unit number of ethylene glycol units or propylene glycol units is small (m+n=2–3) and a monomer in which the recurring unit number of the above units is relatively large (m+n=6–12), in the above-specified amount ratio.

DETAILED DESCRIPTION OF THE INVENTION

The polymerizable composition of the present invention, and the organic lens of the present invention produced therefrom will be explained in detail hereinafter.

The polymerizable composition of the present invention contains the di(meth)acrylate compound of the formula (I) (Component I) as a main monomer.

In the above general formula (I), each of m and n is independently an integer of 1 to 15. Each of two a's is independently an integer of 0 to 4. In view of the light resistance and specific gravity of a polymer obtained by the polymerization of the polymerizable composition of the present invention, a is preferably 0 to 2, particularly preferably 0. When a is 0, X is hydrogen. Each of two X's is independently a halogen atom excluding fluorine. The halogen atom includes chlorine, bromine and iodine, while X is preferably chlorine or bromine in view of light resistance.

Specific examples of the di(meth)acrylate compound of the general formula (I) include 2,2-bis(4-methacryloyloxyethoxyphenyl)propane, 2,2-bis(4-methacryloyloxyethoxy-3-chlorophenyl)propane, 2,2-bis(4-methacryloyloxyethoxy-3,5-dichlorophenyl)propane, 2,2-bis(4-methacryloyloxyethoxy-3-bromophenyl)propane, 2,2-bis(4-methacryloyloxyethoxy-3,5-dibromophenyl)propane, 2-(4-methacryloyloxyethoxyphenyl)-2-(4methacryloyloxyethoxyethoxyphenyl)propane, 2-(4-methacryloyloxyethoxy- 3,5-dibromophenyl)-2-(4-methacryloyloxyethoxyethoxy- 3,5-dichlorophenyl)propane, 2-(4-methacryloyloxyethoxy-3,5-dichlorophenyl)-2-( 4-methacryloyloxyethoxyethoxy-3,5-dibromophenyl)propane, 2,2-bis(4-methacryloyloxyethoxyethoxyphenyl)propane, 2,2-bis(4-methacryloyloxyethoxyethoxy-3-chlorophenyl)propane, 2,2-bis(4-methacryloyloxyethoxyethoxy-3,5dichlorophenyl)propane, 2,2-bis(4-methacryloyloxyethoxyethoxy-3,5-dibromophenyl)propane, 2,2-bis(4-methacryloyloxyethoxyethoxyethoxyphenyl)-propane, 2,2-bis(4-methacryloyloxyethoxyethoxyethoxy-3-chlorophenyl)propane, 2,2-bis(4-methacryloyloxyethoxyethoxyethoxy- 3,5dichlorphenyl)propane, 2,2-bis(4-methacryloyloxyethoxyethoxyethoxy- 3,5dibromophenyl)propane, 2-(4-methacryloyloxyethoxyethoxyphenyl)-2-(4-methacryloyloxyethoxyethoxyethoxyphenyl)propane, 2,2-bis(4-methacryloyloxyethoxyethoxyethoxyethoxyphenyl)propane, 2-(4-methacryloyloxyethoxyethoxyethoxyethoxyphenyl)- 2-(4-methacryloyloxyethoxyethoxyethoxyethoxyethoxyphenyl) propane, 2,2-bis(4-methacryloyloxyethoxyethoxyethoxyethoxyphenyl)propane, 2,2-bis(4-methacryloyloxyethoxyethoxyethoxyethoxy- 3-chlorophenyl)propane, 2,2-bis(4-methacryloyloxyethoxyethoxyethoxyethoxy- 3,5dichlorphenyl)propane, 2,2-bis(4-methacryloyloxyethoxyethoxyethoxyethoxy- 3,5dibromophenyl)propane, 2-(4-methacryloyloxyethoxyethoxyethoxyethoxyethoxyphenyl)- 2-(4-methacryloyloxyethoxyethoxyethoxyethoxyethoxyphenyl)propane, 2-(4-methacryloyloxyethoxyethoxyethoxyethoxyethoxyethoxyphenyl)- 2(4-methacryloyloxyethoxyethoxyethoxyphenyl)propane, 2,2-bis(4-methacryloyloxyethoxyethoxyethoxyethoxyethoxyethoxyethoxyphenyl)propane and 2,2-bis (4-methacryloyloxyethoxyethoxyethoxyethoxyethoxyethoxyethoxyethoxyphenyl)propane.

In the present invention, the di(meth)acrylate compound (Component I) of the general formula (I) is used as a mixture of at least two components comprising 30 to 80 mol %, more preferably 40 to 60 mol %, of a di(meth)acrylate compound of the general formula (I) in which m+n is 2 to 3 and 20 to 50 mol %, more preferably 25 to 45 mol %, of a di(meth)acrylate compound of the general formula (I) in which m+n is 6 to 12. As a result, the polymerizable composition of the present invention can give a polymer excellent in various properties such as light resistance, impact resistance and hardness. The di(meth)acrylate compound of the general formula (I) in which m+n is 2 to 3 may be a single compound or at least two compounds selected from di(meth)acrylate compounds of the general formula (I) in which m+n is 2 to 3. The di(meth)acrylate compound of the general formula (I) in which m+n is 2 to 3 have very high hardness although its impact resistance is inferior to that of any di(meth)acrylate compound of the general formula (I) in which m+n exceeds 3. Compounds of the general formula (I) in which m+n is 0 and 1 are difficult to produce and polymers therefrom are insufficient in light resistance. Hence, when the content of the carboxylic acid of the general formula (I) in which m+n is 2 to 3 is less than 30 mol % based on Component I, a polymer obtained therefrom is insufficient in hardness or light resistance, and when the above content exceeds 80 mol % a polymer obtained therefrom is insufficient in impact resistance.

Further, the di(meth)acrylate compound of the general formula (I) in which m+n is 6 to 12 may be a single compound or at least two compounds selected from di(meth)acrylate compounds of the general formula (I) in which m+n is 6 to 12. When produced, generally, the di(meth)acrylate compound of the general formula (I) in which m+n is as large as 6 to 12 is obtained as a mixture of compounds of the general formula (I) in which the total of m+n consists of various values and as a mixture having a molecular weight distribution to some extent. It is therefore preferred to use this mixture in the present invention. The di(meth)acrylate compound of the general formula (I) in which m+n is 6 to 12 has lower hardness, but much higher impact resistance, than a compound of the general formula (I) in which m+n is smaller than 6. On the other hand, a compound of the general formula (I) in which m+n is over 12 shows an increased viscosity to decrease the workability, and further it shows a great decrease in hardness. Hence, when the content of the compound of the general formula (I) in which m+n is 6 to 12 is less than 20 mol %, a polymer obtained therefrom is insufficient in impact resistance, and when the above content exceeds 50 mol %, the resultant polymer is insufficient in hardness.

In view of the hardness and impact resistance of a polymer obtained from the polymerizable composition of the present invention, the total content of the di(meth)acrylate compound of the general formula (I) in which m+n is 2 to 3 and the di(meth)acrylate compound of the general formula (I) in which m+n is 6 to 12 in Component I is preferably 80 to 100 mol %, particularly preferably 85 to 100 mol %.

Component I may contain less than 20 mol %, preferably less than 15 mol %, of di(meth)acrylate compounds of the general formula (I) in which m+n is other than the above specified ranges.

The polymerizable composition of the present invention may contain only at least two di(meth)acrylate compounds of the above general formula (I) in the above-specified amount ratio, as a polymerizable monomer, while it preferably contains other polymerizable monomer (Component II) in combination. Although not specially limited, the above "other" polymerizable monomer is preferably a monomer having a low viscosity and having at least one polymerizable group in its molecule in view of an improvement in workability. The viscosity of this polymerizable monomer (Component II) is preferably 100 cps or less, more preferably 50 cps or less. The polymerizable group is preferably an acrylate group or a methacrylate group. In view of the strain, hardness and impact resistance of a polymer obtained from the polymerizable composition of the present invention, the amount of the polymerizable monomer (Component II) per 100 parts by weight of the di(meth)acrylate compound (Component I) of the general formula (I) is 0 to 25 parts by weight, preferably 2 to 25 parts by weight, especially preferably 5 to 20 parts by weight.

In the present invention, the above "other" polymerizable monomer (Component II) preferably has the following general formula (II),

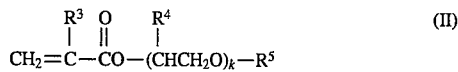

wherein each of $R^3$ and $R^4$ is independently hydrogen or methyl, $R^5$ is hydrogen, an alkyl group having 1 to 6 carbon atoms, an aralkyl group having 7 to 12 carbon atoms, an aryl group having 6 to 15 carbon atoms, a cycloalkyl group having 3 to 10 carbon atoms, a glycidyl group, a cyano group, an acryl group or a methacryl group, and k is an integer of 0 to 10.

That is, the polymerizable composition of the present invention preferably contains, as polymerizable monomers, 100 parts by weight of the di(meth)acrylate compound of the general formula (I) and 0 to 20 parts by weight of the monomer of the general formula (II) alone.

Specific examples of the polymerizable monomer of the above general formula (II) include monomethacrylates such as methyl methacrylate, ethyl methacrylate, 2-hydroxyethyl methacrylate, glycidyl methacrylate, 2-cyanomethacrylate, benzyl methacrylate, polyethylene glycol monomethacrylate and allyl methacrylate; dimethacrylates of (poly)ethylene glycols such as ethylene glycol dimethacrylate, diethylene glycol dimethacrylate, triethylene glycol dimethacrylate and nonaethylene glycol dimethacrylate; and dimethacrylates of (poly)propylene glycols such as propylene glycol dimethacrylate, dipropylene glycol dimethacrylate and hexapropylene glycol dimethacrylate. The above (meth)acrylate compounds may be used alone or in combination.

The polymerizable composition of the present invention may contain additives such as a polymerization promoter, a polymerization moderator, a mold releasing agent, an ultraviolet light absorbent, an antioxidant, a coloring preventer, an antistatic agent, a fluorescent dye, a dye, a pigment and a perfume as required for imparting their functions. Above all, it is preferred to incorporate a hindered phenol compound of the following general formula (III), since the hindered phenol compound has an effect particularly on the storage stability, the prevention of yellowing and the prevention of polymerization strain in the polymerizable composition of the present invention.

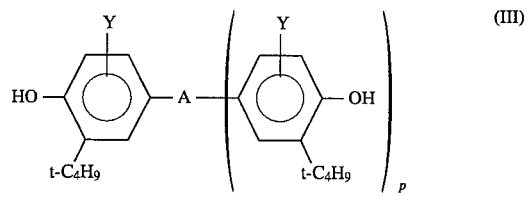

wherein each of two Y's is independently a methyl, hydroxyl or t-butyl group, and p is 0 to 3, and A is hydrogen, methyl or a group of

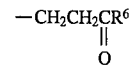

wherein $R^6$ is an alkyl group having 1 to 20, preferably 10 to 15 carbon atoms, when p is 0, a group of $>CHR^7$, -S-,

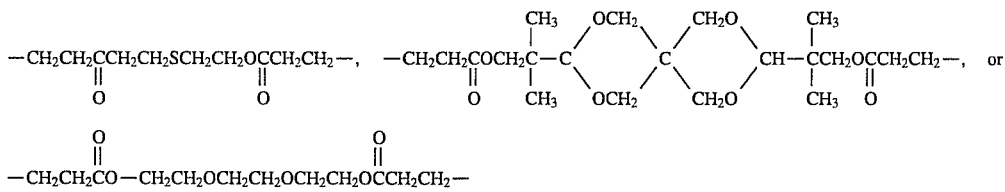

wherein $R^7$ is hydrogen or an alkyl group having 1 to 20, preferably 1 to 5 carbon atoms, when p is 1,
a group of

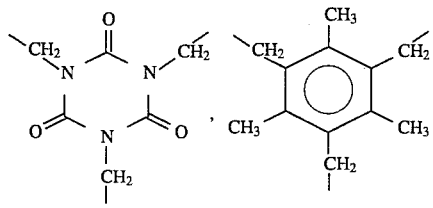

or >CHCH$_2$CHCH$_3$ when p is 2, or
a group of

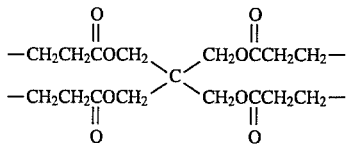

when p is 3.

Examples of the hindered phenol compound of the above general formula (III) include 2,6-di-tertbutylhydroxytoluene, 4-hydroxy-2-tert-butylphenol, tri(4-hydroxy-3,5-di-tert-butylbenzyl)isocyanurate. 1,1-di(4-hydroxy-2-methyl-5-tert-butylphenyl)-3(4-hydroxy- 2-methyl-5-tert-butylphenyl)butane, 1,1-di(4-hydroxy- 2-methyl-5-tert-butylphenyl)butane, octadecanyl tri(4-hydroxy-3,5-di-tert-butylphenyl)propionate, pentaerythritoltetrakis[tri(4-hydroxy-3,5-di-tert-butylphenyl)propionate], β-thioglycoldi[tri(4-hydroxy-3,5-di-tertbutylphenyl)propionate], spiroglycol-di(4-hydroxy-3-methyl- 5-tert-butylphenyl)propionate, and 1,3,5-tri(4-hydroxy- 3,5-di-tert-butylbenzyl)-2, 4,6trimethylbenzene. Of these, 2,6-di-tertbutylhydroxytoluene (BHT) is preferred. Generally, the amount of the hindered phenol compound of the general formula (III) per 100 parts by weight of the polymerizable composition of the present invention is preferably 0.01 to 0.1 part by weight.

The polymerizable composition of the present invention can be polymerized by a known cast molding method to form an organic glass. The polymerization may be carried out by heat polymerization in the presence of a radical polymerization initiator selected from various peroxides and azo compounds. The typical polymerization method is a cast molding method in which the polymerizable composition of the present invention is cast into a mold formed of mold members held with elastomer gaskets or spacers and cured in an air oven, and the resultant molded article is taken out.

The radical polymerization initiator is not specially limited, and can be selected from known initiators. Typical examples of the radical polymerization initiator include diacyl peroxides such as benzoyl peroxide, p-chlorobenzoyl peroxide, decanoyl peroxide, lauroyl peroxide and acetyl peroxide; peroxyesters such as tert-butylperoxy-2-ethylhexanoate, tert-butyl peroxydicarbonate, cumyl peroxydecanoate and tert-butyl peroxybenzoate; percarbonates such as diisopropyloxy dicarbonate, di-2-ethylhexyl peroxydicarbonate and di-sec-butyl peroxydicarbonate; and azo compounds such as azobisisobutyronitrile.

The amount of the radical polymerization initiator differs depending upon the polymerization conditions, the kind of the initiator and the kind and Composition of the above monomers, and cannot be uniformly determined. Generally, the amount of the radical polymerization initiator per 100 parts by weight of the polymerizable composition is preferably 0.01 to 5 parts by weight.

Concerning the polymerization conditions, the temperature in particular has an influence on the properties of the resultant resin. Differing depending upon the kind and amount of the radical polymerization initiator and the kind of the monomers, the temperature cannot uniformly determined. Generally, it is preferred to employ a so-called two-step polymerization method in which the polymerization is initiated at a relatively low temperature, the temperature is gradually increased and the composition is cured at a high temperature at the end of the polymerization. The temperature is preferably 20° to 120° C.

Like the polymerization temperature, the polymerization time also differs depending upon various factors, and it is preferred to determine the optimum period of time depending upon these conditions. However, it is preferred to select the conditions such that the polymerization is terminated within 2 to 40 hours.

The polymerizable composition of the present invention can be cast-molded not only according to a heat polymerization method but also a known photopolymerization method using ultraviolet light or visible light. The photopolymerization is carried out in the presence of a photopolymerization initiator. The photopolymerization initiator is selected from benzoin, benzoin methyl ether, benzoin isobutyl ether, benzophenol, acetophenone, 4,4'-dichlorobenzophenone, diethoxyacetophenone, 2-hydroxy-2-methyl-1-phenylpropan- 1-one, benzyl methyl ketal, 1-(4-isopropylphenyl)- 2-hydroxy-2-methylpropan-1-one, 1-hydroxycyclohexyl phenyl ketone, 2-isopropylthioxantone, and 2,4,6-trimethylbenzoyldiphenylphosphine oxide. Generally, the photopolymerization initiator is used for preventing the coloring and deterioration of the resultant polymer, and the amount thereof per 100 parts by weight of the polymerizable composition is 0.001 to 5 parts by weight.

Further, the light source used for the photopolymerization is preferably selected from those which emit ultraviolet light. The light source is preferably selected from a mercury lamp, a germicidal lamp and a xenon lamp. Further, visible light such as sunlight may be also used. The exposure time differs depending upon the wavelength and intensity of the light source and the shape and material quality of the polymer, and it can therefore be determined in advance on the basis of a preliminary experiment.

When the photopolymerization is carried out, the portion of the mold through which the composition is to be exposed to light is required to be transparent to light, and this portion is generally formed of glass. In particular, a material through which ultraviolet light is easily transmitted, such as quartz glass, is preferred, while the material forming the above portion is not specially limited if it is transparent to light. Further, at the molding time, the polymerization can be carried out with exerting external pressure without any problem.

When the above photopolymerization is carried out, there may be used additives such as a polymerization promoter, a polymerization moderator, a mold releasing agent, an ultraviolet light absorbent, an antioxidant, a coloring preventer, an antistatic agent, a fluorescent dye, a dye, a pigment and a perfume as required for imparting their functions.

The polymer obtained by the above method may be surface-coated with a known coating agent to form a cured coating as required for improving the polymer in surface scratch resistance depending upon use. The coating agent for forming the above cured coating may be selected from so-called crosslinking substances which form a cured coating by reacting under heat, in the presence of a catalyst, a curing agent, or under irradiation with light or radiation and particularly forming a three-dimensional network structure, without any limitation. Examples of the coating agent include melamine-based coating agents containing melamines and other reactive substances such as formaldehyde; acryl-based coating agents containing acrylic acid esters and acrylic acid amides; epoxy-based coating agents containing epoxy compounds and other reactive substances such as bisphenol A; urethane-based coating agents such as polyfunctional isocyanates and other reactive substances such as polyfunctional alcohols; silicon-based coating agents containing organosilicon compounds such as methyltrimethoxysilane; and known coating agents which are complexes of these.

For further strengthening the adhesion between the polymer and the cured coating, it is preferred to carry out the pretreatment of the polymer before the cured coating is formed. The pretreatment can be carried out, for example, by a known alkali treatment method. The higher the alkalinity is, the higher the adhesion is. However, when the alkalinity is extremely high, the polymer itself may be deteriorated, so that it is preferred to carry out the alkali treatment which is more moderate than, for example, the treatment with a 30 wt. % NaOH aqueous solution at 80° C. for 1 hour.

The polymer obtained by curing the above polymerizable composition may be coated with an inorganic hard substance which is an anti-reflection agent, as required. The method of forming the coating of the inorganic hard substance can be selected from known methods without any special limitation. For example, the above method may be preferably selected from dry plating methods such as a vacuum deposition method, an ion plating method and a sputtering method. The thickness of the coating of the inorganic hard substance differs depending upon a purpose and is therefore not specially limited, while it is generally preferably 0.1 to 10 μm.

The above inorganic hard substance can be selected from inorganic compounds or metals which can form a coating on the surface of the polymer by the above dry plating method, without any limitation, and the inorganic hard substance can be properly selected depending upon a purpose. For imparting the polymer with scratch resistance, the inorganic hard substance is generally selected, for example, from silicon oxide ($SiO_x$, x=1–2) and aluminum oxide. For imparting the polymer with anti-reflection properties, the inorganic hard substance is selected, for example, from metal oxides such as silicon oxide, aluminum oxide, zirconium oxide, titanium oxide, cerium oxide, indium oxide, tantalum oxide and hafnium oxide; metal fluorides such as magnesium fluoride, cerium fluoride, lithium fluoride and neodymium fluoride; metal sulfides such as zinc sulfide; and metals such as aluminum, gold, silver and chromium. The polymer may be coated with a single coating of a substance having a low refractive index from the above substances, or the polymer may be coated with a laminate having an optical thickness, formed of a substance having a low refractive index and a substance having a high refractive index. Further, for imparting the polymer with anti-reflection properties and scratch resistance concurrently, the polymer may be coated with a diamond-like carbon which is a dispersion of a fine diamond crystal in amorphous carbon.

The polymer obtained by the polymerization of the polymerizable composition of the present invention is free of an optical strain, has sufficient hardness, and is excellent in impact resistance and light resistance.

The polymer obtained by the polymerization of the polymerizable composition of the present invention is therefore useful as an organic lens, and for example, it is optimum for optical lenses such as an ophthalmic lens and an optical device lens and optimum for use as a prism, an optical disk substrate and an optical fiber.

EXAMPLES

The present invention will be specifically explained with reference to Examples hereinafter, while the present invention shall not be limited to these Examples.

Resins obtained in Examples were measured for various properties by the following testing methods.

(1) Refractive index

A resin was measured for a refractive index with 589.3 nm D ray with Abbe refractometer supplied by Atago K. K. Bromonaphthalene or methylene iodide was used as a contact liquid.

(2) Hardness

A resin test piece having a thickness of 2 mm was measured for a hardness value on an L-scale with a Rockwell hardness tester.

(3) Impact resistance

Steel balls having a weight of 16 g, 32 g, 48 g, 64 g, 80 g, 96 g, 112 g, 131 g, 151 g and 172 g were consecutively dropped on each of 5 to 10 test plates having a thickness of 2 mm and a diameter of 65 mm in free fall, and the resin was evaluated for an impact resistance on the basis of an average of weights of the steel balls having a largest weight which did not break the test plate.

(4) Strain

A sample piece having a thickness of 10 mm and a diameter of 80 mm was placed between two polarization plates of which the orientation axes crossed each other at 90 degrees, and the optical strain was visually observed with transmitted light.

Further, a sample piece was visually observed for optical nonuniformity with a transmitted projected image of an ultrahigh-pressure mercury lamp.

(5) Yellowness (YI)

A sample was measured for a YI with a color difference meter (SM-4 model) supplied by Suga Test Instruments Co., Ltd.

(6) Light resistance

A sample was placed in a long life xenon fadeometer (FAC-25AX-HC model) supplied by Suga Test Instruments Co., Ltd and exposed to xenon light for 200 hours, and then the sample was measured for a YI with a color difference meter (SM-4 model) supplied by Suga Test Instruments Co., Ltd. The light resistance is expressed as an increment ΔYI from the initial YI.

The abbreviations shown in Table 1 refer to the following compounds.

BPDM: Dimethacrylate of polyethylene glycol adduct of 2,2-bis(4-hydroxyphenyl)propane BPDA: Diacrylate of polyethylene glycol adduct of 2,2-bis(4-hydroxyphenyl)propane TBBPDM: Dimethacrylate of polyethylene glycol adduct of 2,2-bis(3,5-dibromo-4-hydroxyphenyl)propane DPMDM: Dimethacrylate of polyethylene glycol adduct of di(4-hydroxyphenyl)methane GMA: Glycidyl methacrylate (viscosity 2 cps)

2G: Diethylene glycol dimethacrylate (viscosity 5 cps)

HEMA: 2-Hydroxyethyl methacrylate (viscosity 6 cps)

IBM: Isoboryl methacrylate (viscosity 7 cps)

BHT: 2,6-di-tert-Butylhydroxytoluene

MEHQ: Hydroquinone monomethyl ether

HQ: Hydroquinone

EXAMPLES 1 TO 12

0.1 Part by weight of 1-hydroxycyclohexyl phenyl ketone as a photopolymerization initiator was add to, and well mixed with, 100 parts by weight of a polymerizable composition containing components shown in Table 1. The resultant mixture liquid was cast into a mold formed of glass plates and gaskets of an ethylene-vinyl acetate copolymer and exposed to ultraviolet light from a metal halide lamp at an output of 120 W/cm for 3 minutes. After the polymerization, the polymer was taken out of the mold, and heat-treated at 130° C. for 1 hour to relax an internal stress. Table 1 shows the physical properties of polymers obtained in the above manner.

Comparative Examples 1–3

Polymers were obtained in the same manner as in Example 1 except that the composition was changed as shown in Table 1. Table 1 shows the physical properties of the so-obtained polymers.

TABLE 1

| Example No. | Component I (part by weight) | Distribution of m + n in Component I (mol %) | | | Component II (part by weight) | Additive (part by weight) |
|---|---|---|---|---|---|---|
| | | 2–3 | 4–5 | 6–12 | 13 or more | | |
| 1 | BPDM (90) | 49 | 10 | 38 | 3 | GMA (10) | — |
| 2 | BPDM (90) | 49 | 10 | 38 | 3 | GMA (10) | BHT (0.03) |
| 3 | BPDM (90) | 53 | 11 | 33 | 3 | GMA (10) | BHT (0.03) |
| 4 | BPDM (90) | 62 | 11 | 25 | 2 | GMA (10) | BHT (0.03) |
| 5 | BPDM (90) | 46 | 2 | 48 | 4 | GMA (10) | BHT (0.05) |
| 6 | BPDM (90) | 58 | 1 | 38 | 3 | GMA (10) | BHT (0.05) |
| 7 | BPDM (95) | 58 | 1 | 38 | 3 | HEMA (5) | BHT (0.05) |
| 8 | BPDM (86) | 58 | 1 | 38 | 3 | GMA (15) | BHT (0.03) |
| 9 | BPDM (90) | 58 | 1 | 38 | 3 | 2G (10) | BHT (0.04) |
| 10 | BPDM (100) | 53 | 10 | 34 | 3 | — | BHT (0.01) |
| 11 | BPDA (90) | 58 | 1 | 38 | 3 | GMA (10) | BHT (0.05) |
| 12 | TBBPDM (90) | 46 | 2 | 48 | 4 | GMA (10) | BHT (0.05) |
| 13 | BPDM (80) | 46 | 2 | 48 | 4 | GMA (5) IBM (15) | BHT (0.03) |
| CEx. 1 | BPDM (100) | 99 | 1 | 0 | 0 | — | BHT (0.03) |
| CEx. 2 | BPDM (100) | 0 | 3 | 88 | 9 | — | BHT (0.03) |
| CEx. 3 | DPMDM (90) | 16 | 52 | 32 | 0 | GMA (10) | BHT (0.03) |
| CEx. 4 | BPDM (90) | 87 | 13 | 0 | 0 | GMA (10) | BHT (0.03) |
| CEx. 5 | BPDM (90) | 0 | 3 | 88 | 9 | GMA (10) | BHT (0.03) |

| Example No. | Refractive index | Hardness | Impact resistance (g) | Strain | Yellowness (YI) | Light resistance (ΔYI) |
|---|---|---|---|---|---|---|
| 1 | 1.549 | 92 | 160 | ○ | 1.98 | 0.40 |
| 2 | 1.549 | 92 | 163 | ○ | 1.39 | 0.20 |
| 3 | 1.550 | 97 | 165 | ○ | 1.53 | 0.21 |
| 4 | 1.553 | 104 | 120 | ○ | 1.57 | 0.24 |
| 5 | 1.547 | 82 | 167 | ○ | 1.52 | 0.26 |
| 6 | 1.549 | 95 | 145 | ○ | 1.31 | 0.24 |
| 7 | 1.551 | 94 | 132 | ○ | 1.42 | 0.21 |
| 8 | 1.548 | 96 | 136 | ○ | 1.51 | 0.28 |
| 9 | 1.550 | 99 | 141 | ○ | 1.41 | 0.31 |
| 10 | 1.552 | 85 | 136 | ○ | 1.64 | 0.36 |
| 11 | 1.551 | 105 | 126 | ○ | 1.41 | 0.22 |
| 12 | 1.563 | 103 | 142 | ○ | 1.72 | 1.21 |
| 13 | 1.546 | 97 | 142 | ○ | 1.37 | 0.35 |
| CEx. 1 | 1.571 | 121 | 44 | ○ | 1.70 | 0.59 |
| CEx. 2 | 1.536 | Not measurable (rubbery) | — | ○ | 1.67 | 0.62 |
| CEx. 3 | 1.553 | 76 | 80 | ○ | 4.31 | 10.21 |
| CEx. 4 | 1.562 | 114 | 52 | ○ | 1.62 | 0.42 |
| CEx. 5 | 1.534 | rubber-like | — | ○ | 1.64 | 0.57 |

CEx. = Comparative Example

What is claimed is:

1. A polymerizable composition comprising:

(1) 100 parts by weight of a di(meth) acrylate compound (Component I) of the general formula (I),

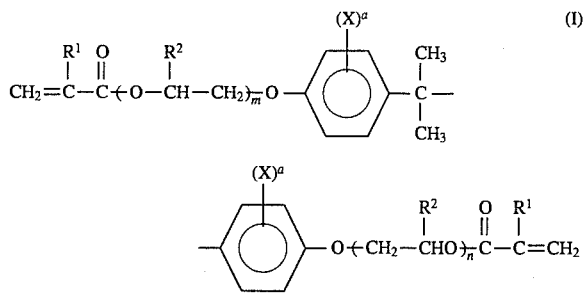

wherein each of $R^1$ and $R^2$ is independently hydrogen or methyl, each of m and n is independently an integer of 1 to 15, X is a halogen excluding fluorine, and a is an integer of to 4, or X is hydrogen when a is 0, provided that, when the amount of Component I is 100 mol %, Component I contains 30 to 80 mol % of a di (meth)acrylate compound of the general formula (I) in which m+n is 2 to 3 and 20 to 50 mol % of a di(meth)acrylate compound of the general formula (I) in which m+n is 6 to 12, and (2) 0 to 25 parts by weight of at least one monomer (Component II) of the general formula (II),

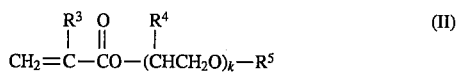
(II)

wherein each of $R^3$ and $R^4$ is independently hydrogen or methyl, $R^5$ is hydrogen, an alkyl group having 1 to 6 carbon atoms, an aralkyl group having 7 to 12 carbon atoms, an aryl group having 6 to 15 carbon atoms, a cycloalkyl group having 3 to 10 carbon atoms, a glycidyl group, a cyano group, an acryl group or a methacryl group, and k is an integer of 0 to 10.

2. The polymerizable composition of claim 1, wherein, when tile amount of Component I is 100 mol %, Component I contains 40 to 60 mol % of a di(meth)acrylate compound of the general formula (I) in which m+n is 2 to 3 and 25 to 45 mol % of a di(meth)acrylate compound of the general formula (I) in which m+n is 6 to 12.

3. The polymerizable composition of claim 1, wherein, when the amount of Component I is 100 mol %, the total amount of a di(meth)acrylate compound of the general formula (I) in which m+n is 2 to 3 and a di(meth)acrylate compound of the general formula (I) in which m+n is 6 to 12 is at least 80 mol %.

4. The polymerizable composition of claim 1, wherein Component II is contained in an amount of 5 to 20 parts by weight per 100 parts by weight of Component I.

5. The polymerizable composition of claim 1, wherein the polymerizable composition further contains a hindered phenol compound in an amount of 0.01 to 0.1 part by weight when the total amount of Component I and Component II is 100 parts by weight.

6. The polymerizable composition of claim 5, wherein the hindered phenol compound is 2,6-di-tertbutylhydroxytoluene.

7. An organic glass formed of a polymer from the polymerizable composition of claim 1.

8. An organic lens formed of a polymer from the polymerizable composition of claim 1.

9. The polymerizable composition of claim 1, wherein a is 0 to 2.

10. The polymerizable composition of claim 1, wherein in formula (I), X is chlorine or bromine.

11. The polymerizable composition of claim 1, wherein the compound of formula (I) is selected from the group consisting of: 2,2-bis(4-methacryloyloxyethoxyphenyl)propane, 2,2-bis(4-methacryloyloxyethoxy-8-chlorophenyl)propane, 2,2-bis(4-methacryloyloxyethoxy-3,5-dichlorophenyl)propane, 2,2-bis(4-methacryloyloxyethoxy-3-bromophenyl)propane, 2,2-bis(4-methacryloyloxyethoxy-3,5-dibromophenyl)-propane, 2-(4-methacryloyloxyethoxyphenyl)-2-(4-methacryloyloxyethoxyethoxyphenyl)propane, 2-(4-methacryloyloxyethoxy-3,5-dibromophenyl)- 2-(4-methacryloyloxyethoxyethoxy-3,5-dichlorophenyl)propane, 2-(4-methacryloyloxyethoxy-3,5-dichlorophenyl)- 2-(4-methacryloyloxyethoxyethoxy-3,5-dibromophenyl)propane, 2,2-bis(4-methacryloyloxyethoxyethoxyphenyl)propane, 2,2-bis(4-methacryloyloxyethoxyethoxy-3-chlorophenyl)propane, 2,2-bis (4-methacryloyloxyethoxyethoxy-3,5-dichlorophenyl)propane, 2,2-bis(4-methacryloyloxyethoxyethoxy- 3,5-dibromophenyl)propane, 2,2-bis(4-methacryloyloxyethoxyethoxyethoxyphenyl)propane, 2,2-bis(4-methacryloyloxyethoxyethoxyethoxy-3-chlorophenyl)propane, 2,2-bis(4-methacryloyloxyethoxyethoxyethoxy- 3,5-dichlorphenyl)propane, 2,2-bis(4-methacryloyloxyethoxyethoxyethoxy- 3,5-dibromophenyl)propane, 2-(4-methacryloyloxyethoxyethoxyphenyl)-2-(4methacryloyloxyethoxyethoxyethoxyphenyl)propane, 2,2-bis(4-methacryloyloxyethoxyethoxyethoxyphenyl)propane, 2-(4-methacryloyloxyethoxyethoxyethoxyphenyl)- 2-(4-methacryloyloxyethoxyethoxyethoxyethoxyphenyl) propane, 2,2-bis(4-methacryloyloxyethoxyethoxyethoxyphenyl)propane, 2,2-bis(4-methacryloyloxyethoxyethoxyethoxyethoxy-3-chlorophenyl) propane, 2,2-bis(4-methacryloyloxyethoxyethoxyethoxyethoxy-3,5-dichlorophenyl)propane, 2,2-bis(4-methacryloyloxyethoxyethoxyethoxyethoxy-3,5-dibromophenyl)propane, 2-(4-methacryloyloxyethoxyethoxyethoxy- ethoxyphenyl)- 2-(4-methacryloyloxyethoxyethoxyethoxyethoxyethoxyphenyl)propane, 2-(4-methacryloyloxyethoxyethoxyethoxyethoxyethoxyphenyl)- 2(4-methacryloyloxyethoxyethoxyethoxyphenyl)propane, 2,2-bis(4-methacryloyloxyethoxyethoxyethoxyethoxyethoxyethoxyethoxyethoxyphenyl)propane and 2,2-bis (4-methacryloyloxyethoxyethoxyethoxyethoxyethoxyethoxyethoxyethoxythoxyethoxyethoxyphenyl)propane.

12. The polymerizable composition of claim 1, wherein the monomer of formula (II) is methyl methacrylate, ethyl methacrylate, 2-hydroxyethyl methacrylate, glycidyl methacrylate, 2-cyanomethacrylate, benzyl methacrylate, polyethylene glycol monomethacrylate, allyl methacrylate, ethylene glycol dimethacrylate, diethylene glycol dimethacrylate, triethylene glycol dimethacrylate, nonaethylene glycol dimethacrylate, propylene glycol dimethacrylate, dipropylene glycol dimethacrylate and hexapropylene glycol dimethacrylate.

* * * * *